United States Patent [19]

Kress

[11] Patent Number: 4,587,690
[45] Date of Patent: May 13, 1986

[54] PROCESS FOR EVISCERATING AN AVIAN CARCASS

[75] Inventor: Jack L. Kress, Wilton, Iowa

[73] Assignee: Oscar Mayer Foods Corporation, Madison, Wis.

[21] Appl. No.: 468,536

[22] Filed: Feb. 22, 1983

[51] Int. Cl.$^4$ ............................................. A22C 21/06
[52] U.S. Cl. .......................................... 17/52; 17/11; 17/1 G
[58] Field of Search ...................... 17/11, 1 G, 46, 52

[56] References Cited

U.S. PATENT DOCUMENTS 2,830,319  4/1958  Muntz ..................................... 17/46
3,927,440  12/1975  Sindler et al. .......................... 17/52

Primary Examiner—Willie G. Abercrombie
Attorney, Agent, or Firm—Joseph T. Harcarik; Thomas R. Savoie; Daniel J. Donovan

[57] ABSTRACT

A method for eviscerating an avian carcass by severing a scapular or its articulation. A coracoid associated with the severed scapula is separated from the vertebral column so that the entrails are exposed for inspection.

15 Claims, 3 Drawing Figures

PROCESS FOR EVISCERATING AN AVIAN CARCASS

CROSS REFERENCE TO RELATION APPLICATION

This application is related to co-pending application Ser. No. 468,535, now U.S. Pat. No. 4,517,207, issued May 14, 1985, entitled "Method for Processing An Avian Carcass" by Jack L. Kress filed concurrently with this application and herein incorporated by reference.

BACKGROUND OF THE INVENTION

1. Field of the Invention

This invention pertains to a method of eviscerating an avian carcass and more particularly to a method for eviscerating an avian carcass wherein a scapula or its articulation is severed and a coracoid associated with the severed scapula is separated from the vertebral column so that the entrails are exposed for inspection.

2. Prior Art

After an avian carcass and particularly a turkey carcass has been bled and defeathered according to current methods, it is necessary to eviscerate the turkey so that the entrails may be inspected to determine wholesomeness of bird. Subsequently, inedible portions are disposed of. According to the present method, an incision is made around the anus of the turkey and the entrails are pulled through the incised opening and are exposed for inspection. According to this present process, however, the incisory cuts may puncture the entrails which would cause fecal contamination of the turkey. Futhermore, since this procedure is done manually, it is a difficult procedure to accomplish and often tires the operator. Current methods of evisceration make it difficult to automate the process.

It has been desired to have a method of eviscerating a turkey carcass wherein more control of the process is obtained and the number of contaminated birds is reduced and the procedure is less tiresome to the operator.

SUMMARY OF THE INVENTION

This invention pertains to a process for eviscerating an avian carcass by severing a scapula or its articulation. A coracoid associated with the severed scapula or its articulation is separated from the vertebral column wherein the entrails are exposed for inspection.

It has been found when this procedure is employed that the chance of rupturing the entrails is diminished and thus the chances of contaminating the bird are decreased. Furthermore, this process is less tiresome to the operator and lends itself to automation.

DESCRIPTION OF PREFERRED EMBODIMENTS

Figure 1:
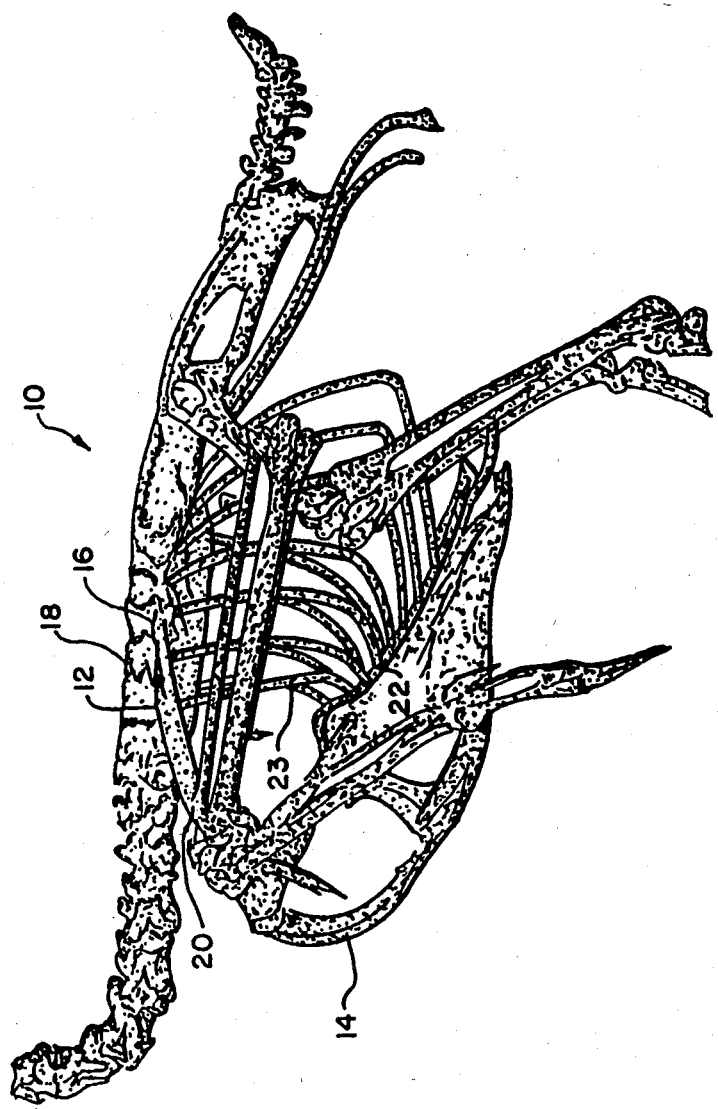
FIG. 1 is a schematic skeletal view of an avian illustrating the mid section.

Referring to FIG. 1 a mid skeletal section 10 of an avian is shown. Suitably, the avian is a turkey carcass or a chicken and preferably the avian is a turkey. An avian contains two scapula bones and two coracoid bones. A scapula 12 and a coracoid 14 is shown in FIG. 1. Scapula 12 is connected to a vertebral column 16 at articulation 18 by means of shoulder muscle (trapezius, rhomboideus, serratus and latissimus dorsi) and is also connected to coracoid 14 at articulation 20.

According to the present invention scapula 12, articulation 18 or articulation 20 is severed. Scapula 12 may be severed by manual means or by mechanical means such as cutting, sawing, or crushing. Articulations 18 or 20 may also be severed by manual or mechanical means such as by pulling, cutting or sawing. After scapula 12 or its articulation 18 or 20 has been severed coracoid 14 is separated from the vertebral column 16. This allows the avian carcass to separate along sternocostal articulations 22 of ribs 23 so that the inside of the avian carcass is exposed and the entrails are visible for easy inspection.

Figure 2:
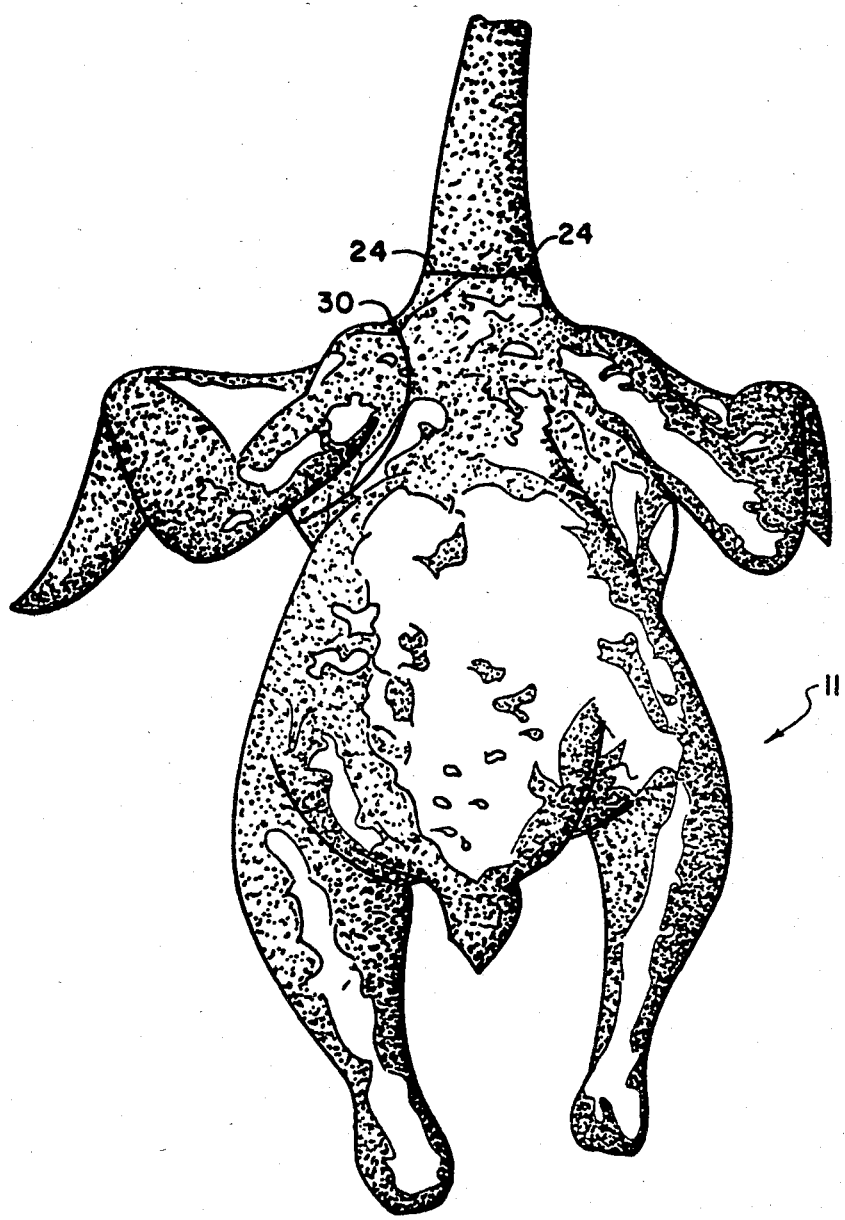
FIG. 2 is a schematic dorsal view of an avian carcass.
Figure 3:
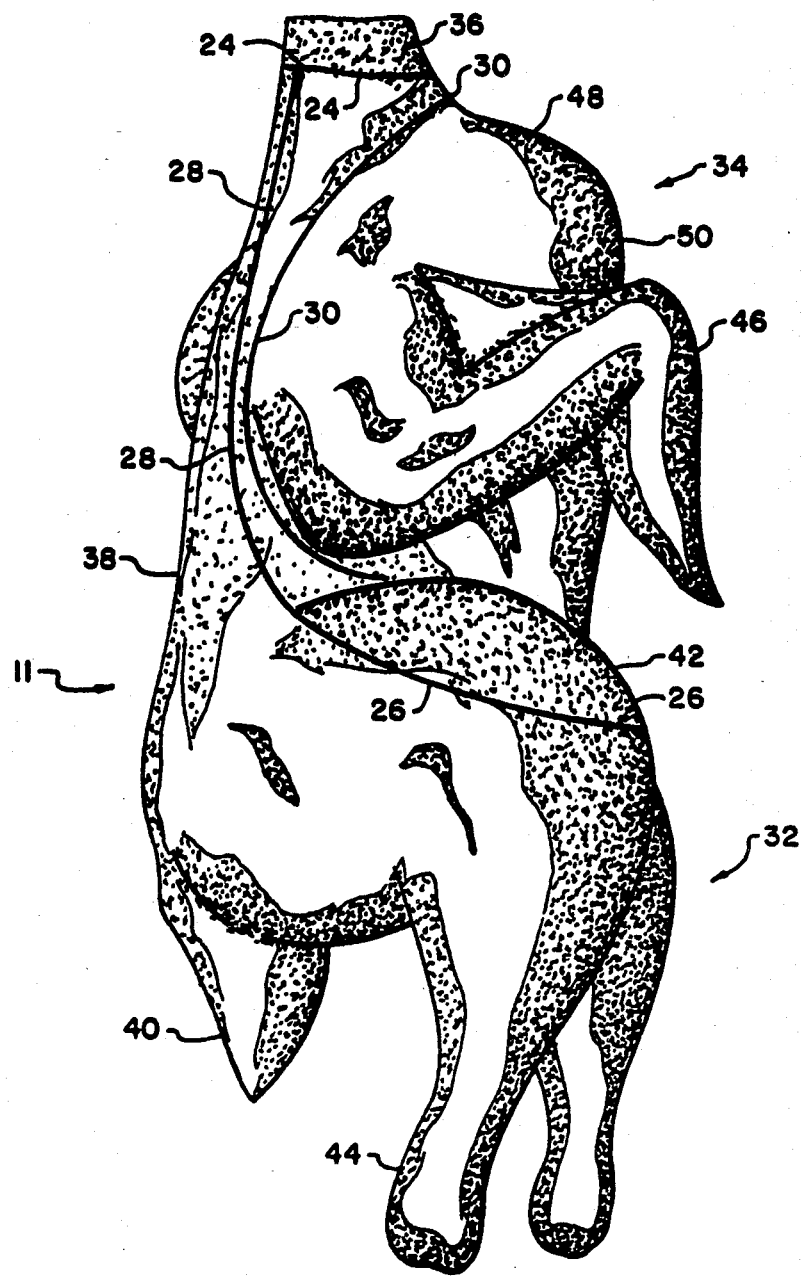
FIG. 3 is a schematic sideview of an avian carcass.

Prior to separating coracoid 14 from vertebral column 16 the skin of the avian must be removed or scored to allow separation of the sternocostal articulations. As shown in FIGS. 2 and 3 the skin of avian carcass 11 is suitably scored by first making a dorsal cervical cut 24. Next the skin is scored beginning from a caudal section 26 then diagonally along line 28 to the dorsal cervical cut 24.

In additon to removing or scoring the skin, the evisceration may be aided by removing all or some of the muscle parts of the avian carcass. Suitably, the removed muscle parts are from the dorsal anterior section of the avian carcass and preferably all of the muscle parts of the avian carcass are removed. When this embodiment is employed, the process of separating coracoid 14 from vertebral column 16 is simplified since less resistance is met. In another embodiment of the invention carcass 11 can be eviscerated without removing muscle parts. In this evisceration an incision 30 is made wherein an incision extends from the anterior and dorsum of the carcass and along the shoulder joint caudally and ventrally and cuts the shoulder muscles between the scapula and the vertebral column. A scapula is then grasped and pulled forward and downward causing the separation of shoulder girdle 48 and the articulation of the ribs as described previously. This results in exposure of the viscera for inspection. In a preferred embodiment, both scapula or their articulation are severed. Furthermore, when both scapula or their articulation are severed, carcass 11 is then separated into pieces 32 and 34. Piece 32 is composed of neck 36, back 38, tail 40, thighs 42, legs 44, and viscera and piece 34 is composed of wings 46, shoulder girdle 48, and breast 50. Pieces 32 and 34 may be separated by cutting through the abdominal wall.

After evisceration and inspection avian carcass 11 or its separated muscle parts may be processed by conventional means such as freezing or may be hot boned prior to chilling or freezing as described in above mentioned co-pending application entitled "Method For Processing an Avain Carcass".

Further Avian anatomy is described by Nickel, R., A. Schummer, E. Seiferle and W. G. Siller, P. A. L. Wight, *Anatomy of the Domestic Birds.* Springer-Verlag, New York, Heidelburg, Berlin, (1977).

The following examples are presented to further illustrate the invention but is to be understood that the invention is not to be limited to the details described therein.

EXAMPLE 1

In this example, the muscle parts and skin are removed from an avian carcass prior to evisceration.

A defeathered and bled turkey carcass with its head and feet removed is hung by its hocks with its dorsal side toward an operator.

A longitudinal cut is made through the skin along the dorsum of the neck. the skin is separated around the neck. Cervical viscera (trachea, esophagus, crop) are removed by traction.

The joint between the autopodium (distal wing) and zeugopodium (middle wing) on both sides is partially cut leaving the anterior edge intact so the former can be folded over the latter.

Wings are removed by cutting through connecting muscles and shoulder joint without entering the pectoral (breast) muscles. The preen gland is also removed.

Coccygeal (tail) vertebrae is separated by a ventral to dorsal cut which allows the tail to be disarticulated. The tail remains attached to the carcass by the remaining unsevered coccygeal muscles and the dorso-lateral skin.

Skin is scored on both sides of the carcass by cutting diagonally from the base of the tail, across the proximal thigh and lateral body wall to connect with the most caudal area where the wings have been removed.

The tail is gripped and pulled anteriorly to the neck removing the dorsal skin and exposing the deeper tissues of the carcass' dorsum.

The tail is removed by cutting through the dorsal skin and the dorsal skin is dissected free of the carcass. (Alternatively, this may be accomplished by removing the tail and dorsal skin as one piece and then separating the tail and skin).

The carcass is inverted and hung by the neck with the ventral side presented to the operator.

The skin over the thighs is elevated by traction and out along the anterior border of the thighs extending the cuts between the thighs and abdominal wall. The skin is removed from the thighs and legs by a combination of traction and dissection in such a manner that it is everted and peeled down to each hock. It is cut off so that only 3-4 cm remains covering the hocks.

Muscles on the proximal medial thighs (e.g. gracilis m., semitendinosus m.) are severed and the coxofemoral (hip) joints disarticulated by reflecting the legs dorso-laterally.

Gluteal muscles are cut free from their origins on the synsacrum. Musculature of the thighs and legs are separated from origins and insertions along the femur and tibiotarsal bones by cutting along the medial surfaces initially and extending cuts around the bones in all directions. The bones are removed leaving the entire deboned musculature of the thighs and legs attached to the carcass.

Muscles of the legs are removed by cutting through the area previously occupied by the femero-patellartibial (knee) joints.

Muscles of the thighs are removed from the carcass by dissection of muscle origins along the synsacrum while gentle traction is being applied to the muscle mass.

Muscles dorsal and lateral to the scapulas are removed by cutting.

Pectoral muscles anterior to the shoulders are separated from the coracoids and furcula by cutting along these bones. Their origins are partially freed by cutting along the sternum until they remain attached only along the ventral sternal keel. The entire pectoral muscle mass from both sides, still covered with skin, is then removed by cutting along the ventral sternal keel while keeping gentle traction on the muscle mass.

Furcula is removed intact by cutting beneath it from ventral to dorsal and manually reflecting it dorsally to disarticulate it from the shoulder joint.

Scapulas are separated from the carcass by cutting between them and the carcass using the belly of the knife blade to cut from the caudal end in a ventro-lateral direction.

Outward and downward traction is placed on the coracoids causing separation of the shoulder girdle and ribs along the sternocostal articulations. This exposes the underlying viscera clearly presenting the heart, liver, intestines and related minor viscera for view. Remaining bones of the shoulder girdle, ribs and sternum are removed by a small cut between the caudal sternum and abdominal wall.

Viscera are grasped, pulled outward and downward and left hanging from the carcass exposing the remaining organs in the carcass.

Viscera are removed by cutting around the cloaca and vent in such a way that visera hanging from the carcass are freed from the carcass.

Neck is separated from the carcass by cutting through the caudal cervical musculature and gently twisting the carcass until separation occurs.

EXAMPLE 2

In this example, an avian carcass is eviscerated by scoring the skin and without removing muscle parts prior to evisceration.

A defeathered and bled turkey carcass with its head and feet removed is hung by its hocks with its dorsal side toward an operator.

A longitudinal cut is made through the skin along the dorsum of the neck. The skin is separated around the neck. Cervical viscera (trachea, esophagus, crop) are removed by traction.

The skin is scored diagonally from the knee joint to the shoulder joint connecting with the above described dorsal cervical cut.

The carcass is hung by the neck with the dorsal side of the carcass presented to the operator.

The shoulder muscles between the scapula and carcass are cut by an incision beginning anterior and dorsal to the carcass and extending the cut around the shoulder joint caudally and ventrally.

Carcass is turned so ventral side is presented to the operator. The scapulas are grasped and pulled forward and downward causing separation of the shoulder girdles and ribs.

This results in excellent exposure of the viscera and separation of the carcass into two main pieces: one composed of the neck, back, tail, thighs, legs and viscera; and the other composed of the wings, shoulder girdle, and breast.

The two pieces are separated by cutting through the abdominal wall.

Viscera are removed as described in Example 1.

What is claimed;

1. A method for eviscerating an avian carcass which comprises:
    (a) removing a muscle part from the avian carcass and thereafter;
    (b) severing a scapula or its articulation; and (c) separating a coracoid associated with the severed scapula or its articulation from the vertebral column causing separation of the sternocostal articulations so that the separation is spaced away from the backbone wherein entrails are exposed for inspection.

2. A method according to claim 1 wherein the avian is selected from the group consisting of turkey and chicken.

3. A method according to claim 2 wherein the avian turkey.

4. A method according to claim 1 wherein both scapula or their articulations are severed.

5. A method according to claim 1 wherein the skin of the avian carcass is removed prior to separating the coracoid from the vertebral column.

6. A method according to claim 1 wherein the skin of the avian carcass is scored prior to separating the coracoid from vertebral column wherein the scoring allows the sternocostal articulations to separate.

7. A method according to claim 1 wherein the muscle part is a wing.

8. A method according to claim 1 wherein the muscle part is a breast.

9. A method according to claim 1 wherein the muscle part is a shoulder.

10. A method according to claim 1 wherein the muscle part is a back.

11. A method according to claim 1 wherein the muscle part is a thigh.

12. A method according to claim 1 wherein the muscle part is a leg.

13. A method according to claim 1 wherein the muscle part is a tail.

14. A method according to claim 3 wherein the removed muscle parts are from the dorsal anterior section of the turkey carcass.

15. A method according to claim 3 wherein all the muscle parts are removed.

* * * * *